United States Patent [19]

Yanagisawa

[11] Patent Number: 5,485,327
[45] Date of Patent: Jan. 16, 1996

[54] MAGNETIC MEMORY DEVICE HAVING A PERFLURO-POLYETHER FILM COATED ON AN INNER SURFACE OF ITS HOUSING FOR ENTRAPPING DUST

[75] Inventor: Masahiro Yanagisawa, Tokyo, Japan

[73] Assignee: NEC Corporation, Japan

[21] Appl. No.: 334,805

[22] Filed: Nov. 4, 1994

Related U.S. Application Data

[63] Continuation of Ser. No. 8,195, Jan. 25, 1993, abandoned.

[30] Foreign Application Priority Data

Jan. 31, 1992 [JP] Japan ................... 4-040632

[51] Int. Cl.⁶ ................................................. G11B 33/14
[52] U.S. Cl. ............................... 360/97.02; 360/97.04
[58] Field of Search .......................... 360/97.02, 97.03, 360/97.04, 97.01, 137, 98.02, 134, 132, 133

[56] References Cited

U.S. PATENT DOCUMENTS

| | | | |
|---|---|---|---|
| 3,975,769 | 8/1976 | King | 360/98.02 |
| 4,307,425 | 12/1981 | Kaneko et al. | 360/97.03 |
| 4,529,659 | 7/1985 | Hoshino et al. | 360/134 |
| 4,626,941 | 12/1986 | Sawada et al. | 360/99.03 |
| 4,933,797 | 6/1990 | Mizutani et al. | 360/132 |
| 5,193,046 | 3/1993 | Lemke et al. | 360/97.02 |

FOREIGN PATENT DOCUMENTS

| | | | |
|---|---|---|---|
| 60-13370 | 1/1985 | Japan | 360/97.02 |
| 60-13371 | 1/1985 | Japan | 360/97.02 |
| 62-248192 | 10/1987 | Japan | 360/97.02 |
| 2-94192 | 4/1990 | Japan | 360/109 |
| 4-103091 | 4/1992 | Japan | 360/137 |
| 4-195782 | 7/1992 | Japan | 360/132 |

*Primary Examiner*—Stuart S. Levy
*Assistant Examiner*—Craig A. Renner
*Attorney, Agent, or Firm*—Laff, Whitesel, Conte & Saret, Ltd.

[57] ABSTRACT

Mechanical components including a magnetic head 3 and a magnetic disk medium 4 are contained in a housing 6 separating from outside atmosphere 5. A perfluoro-polyether film 9 is coated on the inner surface of said housing 6 and the upper surface of a base 2 provided with the housing 6. Floating dust in the housing 6 adheres on and is incorporated in said perfluoro-polyether film 9 so that dust is removed from the space in the housing 6 thereby the space in the housing 6 is maintained at a clean state free from dust. As a result, the head flotation is stabilized, abrasion of the medium and the head can be avoided and the occurrence of head-crush can be prevented.

8 Claims, 1 Drawing Sheet

MAGNETIC MEMORY DEVICE HAVING A PERFLURO-POLYETHER FILM COATED ON AN INNER SURFACE OF ITS HOUSING FOR ENTRAPPING DUST

This application is a continuation, of application Ser. No. 08/008,195, filed Jan. 25, 1993, now abandoned.

BACKGROUND OF THE INVENTION

1. Field of the Invention

This invention relates to a magnetic memory device, wherein information is magnetically written into or read out from a magnetic recording medium such as a magnetic disk, magnetic drum, a magnetic tape and the like through a magnetic head and the like.

2. Description of the Prior Art

In a magnetic memory device, information is magnetically written into and read out from said magnetic recording medium through the magnetic head (hereinafter referred to as the head) during which a magnetic head slider (hereinafter referred to as the slider) is maintained to contact with a magnetic recording medium (hereinafter referred to as the medium) or to be separated from the medium by a thin air gap. As this type of the magnetic memory device, a magnetic tape memory device, a magnetic card memory device, a flexible disk memory device and a hard disk memory device are commercially available.

In the flexible disk and the hard disk device of these magnetic memory devices, the head will be separated from the medium by a thin air gap when the medium is rotating due to an air pressure generated by the rotation of the medium. On the other hand, a spring is attached to the head in order to push the head toward the medium. Consequently, the head is maintained at certain position balancing a floating force by the air pressure with a force of the spring pushing the head against the medium. In all these magnetic memory devices wherein information is written into or read out from the medium through the head which is separated from the medium, it is necessary to maintain the slider close to the medium as much as possible in order to maximize the storage density. For this purpose, in case of the hard disk memory device for example, the width of air gap between the slider and the medium is maintained at 0.2 µm in minimum.

In case the air gap is so much thin as mentioned above, flotation of the head will be disturbed by dust floating in the housing and become unstable thus causing problems that the head having unstable flotation and the medium contact each other which results in abrasion of the head and the medium. Also, head-crush will occur due to such contact of the head with the medium.

SUMMARY OF THE INVENTION

Accordingly, it is an object of the present invention to provide a magnetic memory device, wherein abrasion of the medium and the head by dust can be prevented and head-crush can be avoided.

The magnetic memory device according to the present invention comprises a housing separating mechanical components including the magnetic medium from outside atmosphere and a perfluoro-polyether film coated on a whole or a part of the inner surface of the housing.

Perfluoro-polyether, hereinafter referred to as PFPE, which can be used for coating of the inner surface of the housing in the present invention, includes one of the following repeating units: $—OCF_2—$, $—OC_2F_4—$, $—OCF_2CF(CF_3)—$, and $—OC_3F_6—$. As example of such PFPEs, materials expressed by the following formula can be listed:

(1) $F_3C(OCF_2)_p(OC_2F_4)_qOCF_2OCF_3$
(2) $F(CF(CF_3)CF_2O)_mC_2F_5$
(3) $F(C_3F_6O)_rC_2F_5$
(4) $GCF_2(OCF_2)_p(OC_2F_4)_qOCF_2G$
(5) $F(CF(CF_3)CF_2O)_mCF_2G$
(6) $F(C_3F_6O)_rC_2F_4G$
(7) $F(CF(CF_3)CF_2O)_mCF_2JCF_2(OCF_2(CF_3)CF)_mF$
(8) $F(C_3F_6O)_rC_2F_4JC_2F_4(OC_3F_6)_rF$
(9) $\{F(C_3F_6O)_rC_2F_4\}_3L$ where, p, q or r is either 1 or other positive integer and m is either 3 or greater integer. And, G is a functional group selected from the group consisting of $—COOH$, $—CH_2OH$, $—COOR$ (R is either hydrocarbon, fluoro-hydrocarbon or aromatic hydrocarbon), $—CONHC_6H_3(CH_3)NCO$, $—N=N—NH_2$, $—SO_3H$, $—CSOH$, $—COSH$ and a functional group shown in the following formula (1).

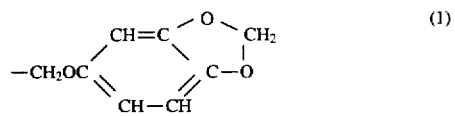
(1)

J is either $—SO_2NHCO—$, $—SO_2NHCH_2—$, $—CH_2N(OH)CH_2—$, $—CONHCO—$, $—CONHCH_2—$ or $—CSNH—$. L is $—CH_2(N(NH)—)CH_2—$.

According to the magnetic memory device of the present invention, because any dust in the housing adheres on PFPE film, the atmosphere in the housing can be maintained at a clean state free from any appreciable amount of dust. The magnetic memory device according to the present invention thereby can stabilize the floating of the head and reduce the occurrence of head-crush compared to the conventional magnetic memory device, and, in effect, the reliability of the device is significantly increased.

Although it is not exactly known what mechanism involves in trapping of dust floating in the housing by PFPEs, but it is speculated that dust will be buried and trapped in the PFPE film, because PFPEs are of soft materials (most of PFPEs are liquid). The PFPE film is effective in trapping dust if the PFPE film is provided on the inner surface wherever in the housing.

However, the maximum trapping effect can be obtained if the region of the inner side walls of the housing which faces to the peripheral surface of the magnetic disk medium or is located near the magnetic disk medium are coated with the PFPE film. Such effect might be attained due to a centrifugal force generated by rotation of the magnetic disk medium. That is, dust particles floating near by the magnetic disk medium are given a high impact energy by the centrifugal force thereby bury in said PFPE film.

DETAILED DESCRIPTION OF THE PREFERRED EMBODIMENTS

Figure 1:
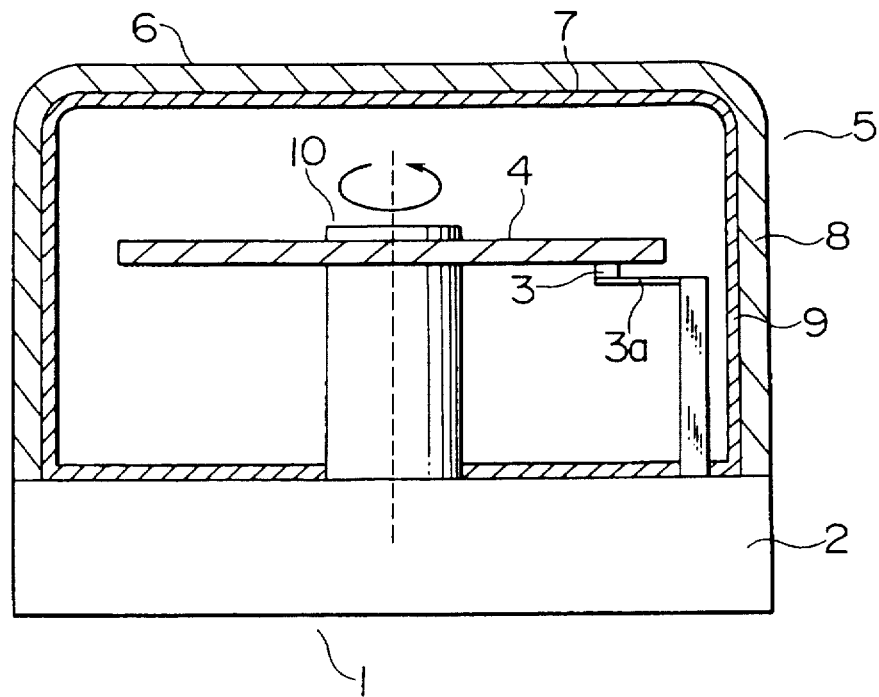
FIG. 1 is a sectional view showing a magnetic memory device according to the first embodiment of the present invention.

Now, a first embodiment of the present invention will be described. As shown in FIG. 1, a magnetic memory device 1 is provided with a rotary spindle 10 on a base 2 and this rotary spindle 10 is connected to a driving shaft of a motor (not shown in the drawing) provided in the base 2. A magnetic disk medium 4, facing its recording surface downwards, is attached to the rotary spindle 10 at its central part. By this rotary spindle 10, the magnetic disk medium 4 is rotated with keeping its recording surface horizontally. On the other hand, a magnetic head 3 is placed in contact with the lower recording surface of the magnetic disk medium 4 and supported by a supporting member 3a made of flexible material. The magnetic head 3 is arranged to be pushed on the lower recording surface of the magnetic disk medium 4 at a desired force by the supporting member 3a. In order to separate a whole mechanical member including these magnetic head 3 and magnetic disk medium 4 from the outside atmosphere 5, a housing 6 is air-tightly provided on the base 2. That is, the housing 6 is provided on the base 2 in such a way to cover a whole mechanical member including the magnetic head 3 and the magnetic disk medium 4.

And, on the inner surface 7 of the housing 6 (the inner wall of the ceiling and the inner side walls 8) and the upper surface of the base 2, a PFPE film 9 is coated thereby a whole inner surface of the housing 6 surrounding said mechanical members, i.e., a whole inner surface of walls defining a space in which said mechanical members are placed, is coated with the PFPE film 9. This PFPE film 9 is comprised of $F(C_3F_6O)_{20}C_2F_4CH_2OH$ or $GCF_2(OCF_2)_{13}(OC_2F_4)_8OCF_2G$ (where, G is a functional group shown in said formula (1)). This PFPE film 9 can be coated on the inner surface by sweeping with a piece of cloth containing PFPE liquid.

In the magnetic memory device thus constituted, dust already existing in the housing 6 before assembling of the magnetic memory device or dust came into the housing 6 after assembling will float in the space between the magnetic head 3 and the magnetic disk medium 4, but when floating dust particles run into the inner surface 7 of the housing 6 and the inner upper surface of the base 2, they are trapped in the PFPE film 9 coated on the surface thereby dust is removed from the inside of the housing 6 where is kept free from dust. Therefore, unstable flotation of the head 3 due to dust can be avoided and also the occurrence of head-crush can be prevented.

Figure 2:
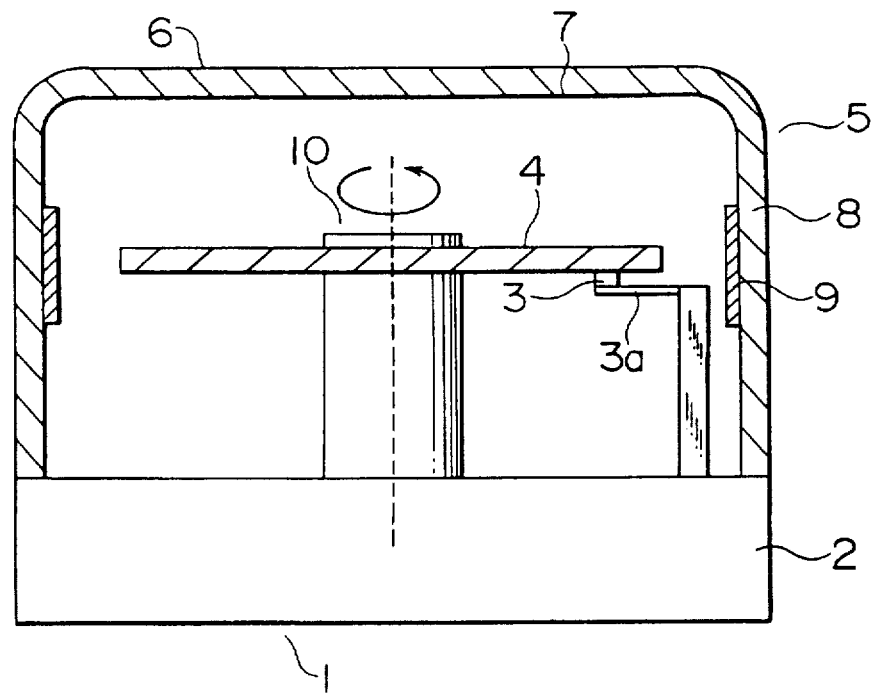
FIG. 2 is a sectional view showing a magnetic memory device according to the second embodiment of the present invention.

FIG. 2 is a sectional view showing a magnetic memory device according to the second embodiment of the present invention. In this embodiment, the PFPE film 9 is formed only on a part of the side wall 8 facing to the edge of the magnetic disk medium 4 in the housing 6. Floating dust particles in the housing 6 run outward in the direction of the diameter of magnetic disk medium 4 by a centrifugal force or on the air flow generated by the rotation of the magnetic disk medium 4 thereby dust particles come flying to a part of the inner side walls 8 near by the magnetic disk medium 4 in the housing 6 and adhere to the PFPE film 9 provided on this part. Although there exist some dust particles come flying to other parts, most dust particles fly outward in the direction of the diameter of magnetic disk medium 4. Therefore, in this embodiment the cleaning in the housing 6 can be achieved, thereby unstable flotation of the head and head-crush can be prevented similarly as the first embodiment.

Next, the effect of embodiment of the present invention will be explained, comparing with the conventional device.

A magnetic memory device coated with a PFPE film 9 on a whole inner surface of a housing 6 as shown in FIG. 1, hereinafter referred to as the device A, a magnetic memory device coated with a PFPE film 9 on a whole inner surface of a housing 6 except for the area of side walls 8 near by a magnetic disk 4, hereinafter referred to as the device B, and a magnetic memory device coated with a PFPE film 9 on only a part of side walls of a housing 6 near by a magnetic disk 4 as shown in FIG. 2, hereinafter referred to as the device C were prepared. For the purpose of comparison, a magnetic memory device without coating with a PFPE film, hereinafter referred to as the device D, was also prepared. At least the surface of the housing 6 facing to the inner space defined by the housing was formed with aluminum alloy. Also, all magnetic memory devices A, B, C and D, 30 pieces each, were assembled in atmosphere containing dust particles of diameter not less than 0.1 μm at the rate of $10^6$ particles per 1 m$^3$.

After 1000 hours operation, two out of 30 devices showed head-crush in the device B. In the device D assembled for comparison, twelve out of 30 devices showed head-crush. On the other hand, no head-crush could be seen in the devices A and C. As explained above, dust in the housing can be removed by the PFPE film and the atmosphere in the housing can be kept in a clean state free from dust in the magnetic memory device according to the present invention, resulting in head-crush being prevented.

What is claimed is:

1. A magnetic memory device comprising:

a housing means separating mechanical components means, including a magnetic medium means, from outside atmosphere, and coating means comprising a prefluoro-polyether film coated on whole or a part of the inner surface of said housing means for trapping dust which may be contained within said housing means.

2. The magnetic memory device according to claim 1, wherein said magnetic medium means is a circular magnetic disk medium and said coating means comprising said perfluoro-polyether film is coated on a part of the inner surface of said housing means and is located at a position inside said housing means near a circumferential periphery of said magnetic disk medium.

3. The magnetic memory device according to claim 1, wherein said magnetic medium means is a hard disk means.

4. The magnetic memory device according to claim 1, wherein said magnetic medium means is a floppy disk means.

5. A magnetic disk drive comprising a closed housing means having a rotatable disk means therein, a slider means supported adjacent to and separated from said rotatable disk means by an air gap, a film means on an inside wall of said housing means at least adjacent a circumference of said disk means for collecting dust within said housing means, said film means being a perfluoro-polyetherfilm which collects said dust within said housing means.

6. The magnetic memory device according to either claim 1 or claim 5, wherein said perfluoro-polyether film contains one of the repeating unit taken from a group consisting of: —$OCF_2$—, —$OC_2F_4$—, —$OCF_2CF(CF_3)$—, and —$OC_3F_6$.

7. The magnetic memory device according to either claim 1 or claim 5, wherein said perfluoro-polyether film is made of a material selected from the group consisting of:

$F_3C(OCF_2)_p(OC_2F_4)_qOCF_2OCF_3$, $F(CF(CF_3)CF_2O)_mC_2F_5$, $F(C_3F_6O)_rC_2F_5$, $GCF_2(OCF_2)_p(OC_2F_4)_qOCF_2G$, $F(CF(CF_3)CF_2O)_mCF_2G$, $F(C_3F_6O)_rC_2F_4G$, $F(CF(CF_3)CF_2O)_mCF_2JCF_2(OCF_2(CF_3)CF)_mF$, $F(C_3F_6O)_rC_2F_4JC_2F_4(OC_3F_6)_rF$, and $\{F(C_3F_6O)_rC_2F_4\}_3L$, where, p, q or r is either 1 or other positive integer; m is either 3 or greater integer; G is a functional group selected from the group of —COOH, —CH$_2$OH, —COOR (R is either hydrocarbon, fluoro-hydrocarbon or aromatic hydrocarbon), —CONHC$_6$H$_3$(CH$_3$)NCO, —N=N—NH$_2$, —SO$_3$H, —CSOH, —COSH and

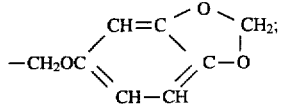

J is a functional group selected from the group of —SO$_2$NHCO—, —SO$_2$NHCH$_2$—, —CH$_2$N(OH)CH$_2$—, —CONHCO—, —CONHCH$_2$— and —CSNH—; L is —CH$_2$(N(NH)—)CH$_2$—.

8. The drive of claim 5 wherein substantially the entire inside wall of said housing means is covered with said film means.

* * * * *